United States Patent
Nijdam et al.

(10) Patent No.: US 12,024,892 B2
(45) Date of Patent: Jul. 2, 2024

(54) SUPPORT FOOT FOR A FREE STANDING STRUCTURE

(71) Applicant: J. VAN WALRAVEN HOLDING B.V., Mijdrecht (NL)

(72) Inventors: Frank Nijdam, Harderwijk (NL); Marek Juzak, Mijdrecht (NL)

(73) Assignee: J. VAN WALRAVEN HOLDING B.V., Mijdrecht (NL)

( * ) Notice: Subject to any disclaimer, the term of this patent is extended or adjusted under 35 U.S.C. 154(b) by 245 days.

(21) Appl. No.: 17/639,126

(22) PCT Filed: Sep. 4, 2019

(86) PCT No.: PCT/NL2019/050573
§ 371 (c)(1),
(2) Date: Feb. 28, 2022

(87) PCT Pub. No.: WO2021/045610
PCT Pub. Date: Mar. 11, 2021

(65) Prior Publication Data
US 2022/0290436 A1    Sep. 15, 2022

(51) Int. Cl.
*F24S 25/61*    (2018.01)
*E04D 13/12*    (2006.01)
(Continued)

(52) U.S. Cl.
CPC .............. *E04D 13/12* (2013.01); *F24S 25/61* (2018.05); *F24S 25/63* (2018.05); *F24S 25/632* (2018.05);
(Continued)

(58) Field of Classification Search
CPC . E04D 11/005; F24S 2025/6004; F24S 25/61; F24S 25/632; F24S 25/634; F24S 25/65
See application file for complete search history.

(56) References Cited

U.S. PATENT DOCUMENTS 9,404,264 B2 *   8/2016   Van Walraven ........ E04D 13/12
9,554,649 B2 *   1/2017   Saich ....................... H01Q 1/12
(Continued)

FOREIGN PATENT DOCUMENTS

DE    202009006367 U1    9/2010
DE    102010007016 A     8/2011
(Continued)

OTHER PUBLICATIONS

International Search Report for PCT/NL2019/050573 dated May 12, 2020 (2 pgs).
(Continued)

*Primary Examiner* — Bradley Duckworth
(74) *Attorney, Agent, or Firm* — Tutunjian & Bitetto, P.C.

(57) ABSTRACT

A support foot for supporting a free standing structure on a support surface such as a rooftop includes a holding means for holding a profiled section to which other parts of said structure can be mounted. The profiled section includes at least one wall having apertures formed in it. The support foot includes a base part having a socket. The support foot furthermore includes a securing element adapted to be received in the socket and having at least one movable catch member to catch an edge of one of said apertures so as to secure the profiled section element to the support foot. The catch member is movable from a pre-assembly position, in which it can be inserted through the aperture, to a securing position, in which it engages over the edge of the aperture.

12 Claims, 5 Drawing Sheets

(51) Int. Cl.
  *F24S 25/63* (2018.01)
  *F24S 25/632* (2018.01)
  *F24S 25/60* (2018.01)

(52) U.S. Cl.
  CPC ............ *F24S 2025/6002* (2018.05); *F24S 2025/6004* (2018.05)

(56) References Cited

U.S. PATENT DOCUMENTS

| | | | |
|---|---|---|---|
| 9,853,595 B1* | 12/2017 | Okado | F24S 25/61 |
| 10,027,273 B2* | 7/2018 | West | H02S 20/23 |
| 10,187,006 B2* | 1/2019 | Almy | H02S 20/23 |
| 2007/0272234 A1 | 11/2007 | Allen et al. | |
| 2010/0038516 A1 | 2/2010 | Trueb | |
| 2012/0073237 A1 | 3/2012 | Brown | |

FOREIGN PATENT DOCUMENTS

| | | |
|---|---|---|
| EP | 2228501 A | 9/2010 |
| WO | 2014020321 A1 | 2/2014 |

OTHER PUBLICATIONS

Official Communication cited in corresponding Austria Patent Application Serial No. GM 50156/2022 dated Apr. 13, 2023 (4 pgs).

* cited by examiner

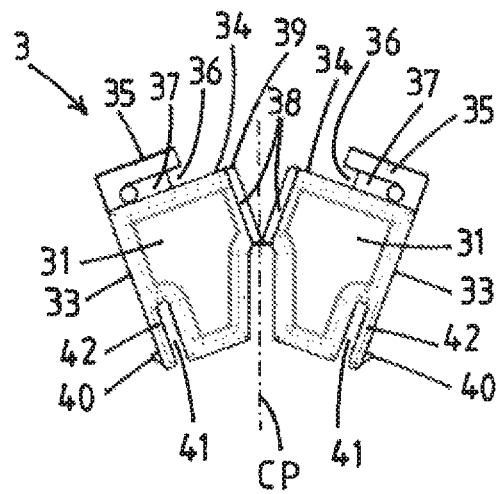
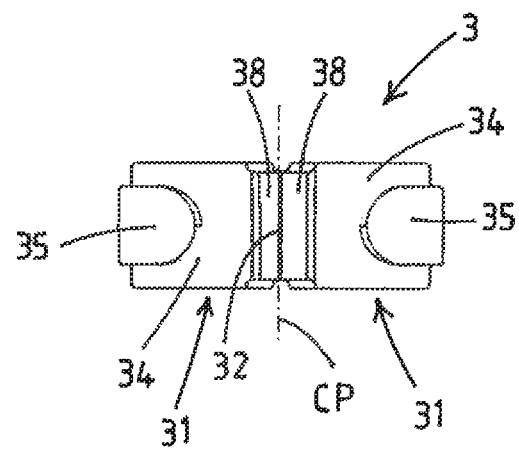
Fig.7  Fig.8
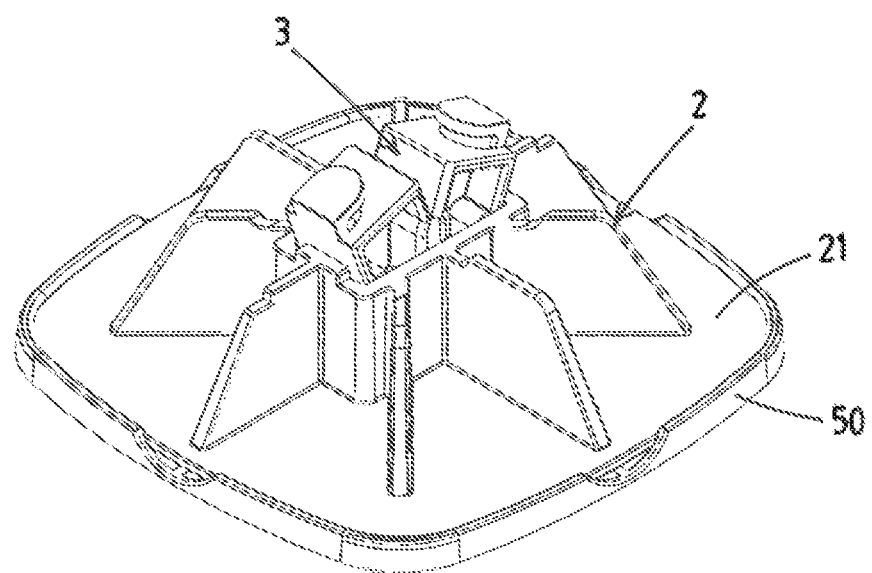
Fig.9

SUPPORT FOOT FOR A FREE STANDING STRUCTURE

BACKGROUND

1. Technical Field

The invention relates to a support foot for supporting a free standing structure on a support surface such as a flat roof, the support foot including a holding means for holding a profiled section element to which other parts of said structure can be mounted, wherein the profiled section element comprises at least one wall having apertures formed in it.

2. Description of Related Art

It is known to place installations like climate installations, solar panels, walkways, piping etc. on rooftops which are horizontal or have a small inclination. The rooftops are often provided with an insulation layer with a moisture proof and vaportight sheet, e.g. from bitumen. These roof insulation layers and sheets are not made to carry high loads. Furthermore it is desirable to prevent as much as possible piercing the sheets for anchoring a structure to the roof, because the piercings may cause problems with water/moisture resistance of the roof.

To overcome the problem of piercing it is known in the art to place installations free standing on a roof.

In WO 2014/020321 A1 a support foot is disclosed which has a socket in which a profiled section element, in this particular example a strut rail or channel, can be inserted. The profiled section element is upstanding and extends in a direction perpendicular to the bottom surface of the support foot. Other framework members can be mounted to the upstanding strut rail.

In US 2010/0038516 A1 a roof block is disclosed for providing underlying support for a plurality of elongate members, such as profiled section elements with a C-shaped cross section. The roof block comprises a base portion and a pedestal portion. The pedestal portion is adapted to support a lying profiled section element, such as said C-shaped profiled section element. The profiled section element can be fixed to the pedestal by threaded rods or the like.

In EP 2228501 a two-part support foot is disclosed comprising a base part and a holding means for holding the profiled section element, wherein the holding means comprises a skid part which is initially moveable with respect to a base part to adapt the orientation of the holding means and thus of the profiled section element with respect to the base part and thus the rooftop it is placed on. In one embodiment the holding means comprises a socket adapted to receive an upstanding profiled section element. In another embodiment the holding means is configured to receive the profiled section element in a lying fashion. The profiled section element can be fixed to the holding by means of bolts.

Fixing a lying profiled section element to a support foot by means of bolts or the like, as is disclosed in US 2010/0038516 A1 and EP 2228501 is time consuming.

SUMMARY OF THE INVENTION

It is an object of the present invention to provide an alternative support foot, which can be used for upstanding and lying profiled section elements and which allows a quick fixation of the profiled section element.

This object is achieved by a support foot for supporting a free standing structure on a support surface such as a rooftop, the support foot including a holding means for holding a profiled section element to which other parts of said structure can be mounted, wherein the profiled section element comprises at least one wall having apertures formed in it, the support foot comprising:
 a base part having a socket, and
 a securing element adapted to be received in the socket and having at least one movable catch member to catch an edge of one of said apertures so as to secure the profiled section element to the support foot, wherein the catch member is movable from a pre assembly position, in which it can be inserted through the aperture, to a locking position, in which it engages over the edge of the aperture.

The movable catch member allows for an easier fixation of a lying profiled section element. Furthermore, the securing element, which is a separate part from the base part, can be inserted in the socket when the support foot is used to support a lying profiled section element, and the securing element may be omitted when the support foot is used to support an upstanding profiled section element. In the latter case an end portion of the profiled section element is inserted in the socket.

In a possible embodiment of the support foot the securing element comprises a sliding surface associated with the catch member, said sliding surface being biased resiliently outwardly and adapted to slide along an edge of the socket when the securing element is inserted in the socket, such that the sliding surface is forced inwardly by the edge of the socket, whereby the catch member is moved from the preassembly position to the securing position. This structure with a sliding surface provides the advantage that the securing mechanism is activated automatically when the securing element is pushed in the socket. The user thus only has to place the aperture wall of the profiled section element on the securing element such that the catch member is received in one of the apertures in the wall, and then push the profiled element down, whereby the sliding surface slides along the edge of the socket and is forced inwardly. The catch member moves accordingly and grips over the edge of the aperture thereby securing the profiled section element to the support foot. The user simply can place and push and the profiled element is fixed to the support foot, which is less time consuming than fixing a profiled section element to a support foot by means of screws or the like.

In a preferred embodiment the securing element comprises two opposing bodies connected by a hinge wherein the sliding surface is formed on the body side facing away from the hinge, and wherein the catch member is formed on top of the body. This securing element thus has two catch members which move towards each other when the securing element is pushed in the socket. The two catch members prevent that the profiled section element can be moved relatively to the securing element in the longitudinal direction of the profiled section element.

In a further embodiment a hinging axis defined by the hinge lies in a centre plane which extends between the two opposing bodies.

Preferably the securing element is substantially of symmetrical design, wherein the centre plane constitutes a plane of symmetry. In such a symmetrical design the securing element thus has two opposite sliding surfaces which slide over two opposite edge portions of the socket. In this way the inwardly directed forces applied by the socket edge portions to the securing element are balanced, which facilitates the insertion of the securing element in the socket.

In a further embodiment at least one of the bodies has a locking lug formed on the side of the sliding surface, and wherein the socket is formed with a locking recess to cooperate with the locking lug when the securing element is fully inserted in the socket. The cooperating locking lug and locking recess prevent that the securing element can be pulled upwardly out of the socket and the profiled section element may be released inadvertently.

The securing element is preferably made of a plastics material. An injection moulding process is suitable to make such a plastic product.

The base part is preferably made of a plastics material. The used plastic material may be a recycled plastics material. An injection moulding process is suitable to make such a product.

In a preferred embodiment of the support foot the socket is shaped and dimensioned to receive an end portion of a profiled section element in upstanding position. In this embodiment the support foot can be used to support a lying profiled section element wherein the securing element is used, and the support foot can be used to support an upstanding profiled section element (possibly of the same type), wherein the securing element is omitted and an end portion of the profiled section element is directly placed in the socket.

In a preferred embodiment the support foot comprises a rubber underlay which is arranged under the base part. This rubber underlay provides a better grip on the surface the support foot is placed on. Furthermore the rubber underlay works as a vibration insulating feature.

BRIEF DESCRIPTION OF THE DRAWINGS

The invention will be further described in the following detailed description with reference to the drawing, in which:

FIG. 7 shows a front elevational view of a securing element of the support foot of FIG. 1, FIG. 8 shows a top elevational view of the securing element of FIG. 7, FIG. 9 shows a view in perspective of the support foot of FIG. 1 with a rubber underlay.

DETAILED DESCRIPTION

Figure 1:
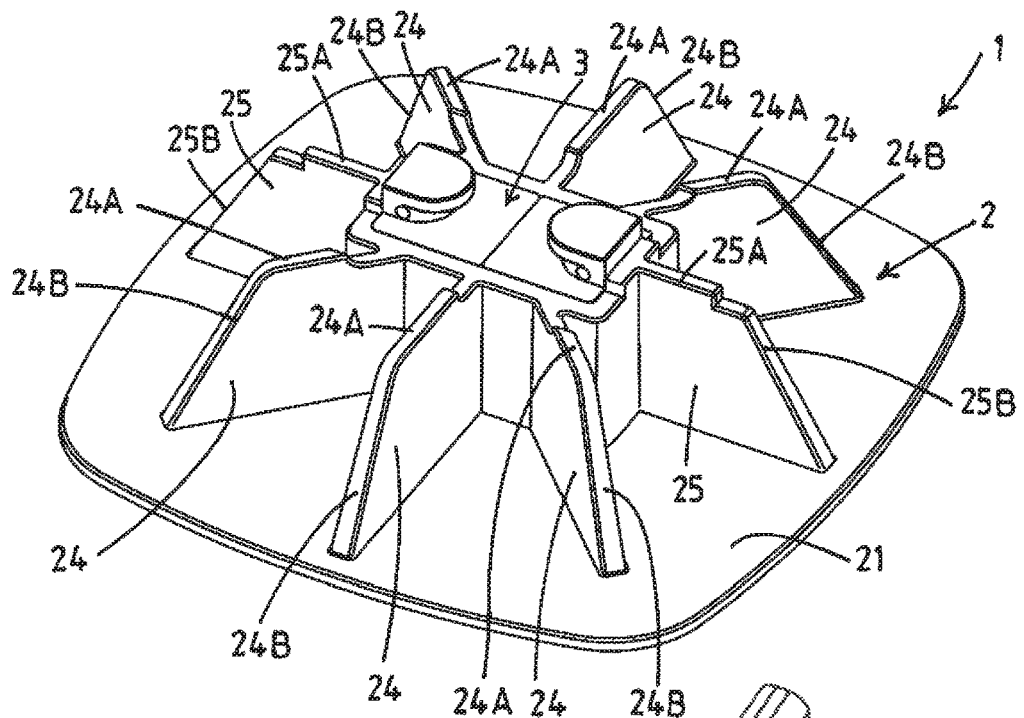
FIG. 1 shows a view in perspective of a preferred embodiment of a support foot according to the invention.

In FIG. 1 a support foot 1 is shown which is adapted to support a free standing structure on a support surface such as a flat roof. Free standing structures may be frameworks for supporting installations like climate installations, solar panels, walkways, piping etc. on rooftops which are horizontal or have a small inclination.

Such frameworks often comprise profiled section elements, which are generally hollow or channel shaped elements made of metal, although also plastic profiled elements are known but less feasible for a support framework application as indicated above.

Figure 2:
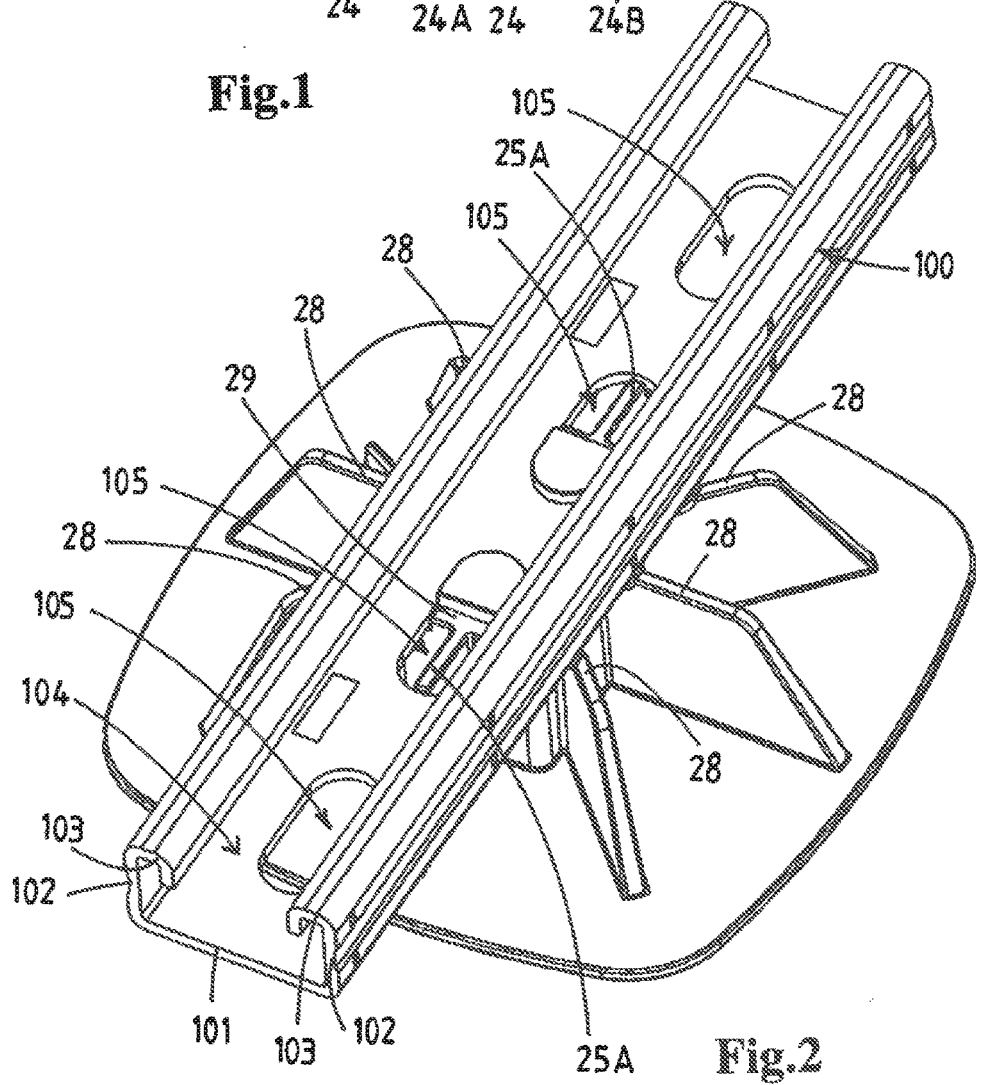
FIG. 2 shows a view in perspective of the support foot of with a profiled section element secured to it.

FIG. 2 shows a profiled section element 100, which is commonly used in such frameworks. This typical profiled section element is often called a mounting rail in the relevant field. In the following description and in the figures the mounting rail is used by way of practical example of a profiled section element. The profiled section element 100, as is shown in FIG. 2, generally has a C-shaped cross section, having a bottom wall 101, two opposing lateral walls 102 extending from the bottom wall, and an upper side opposite the bottom wall, which upper side includes two flanges 103 and a longitudinal slot 104 defined between the flanges 103. In this example the bottom wall 101 of the profiled section element 100 is provided with oblong apertures 105 with rounded end portions, which is a common feature for such mounting rails. It is noted that the profiled section element 100 is only intended as an example and also other profiled section elements can be used with the support foot 1.

Figure 3:
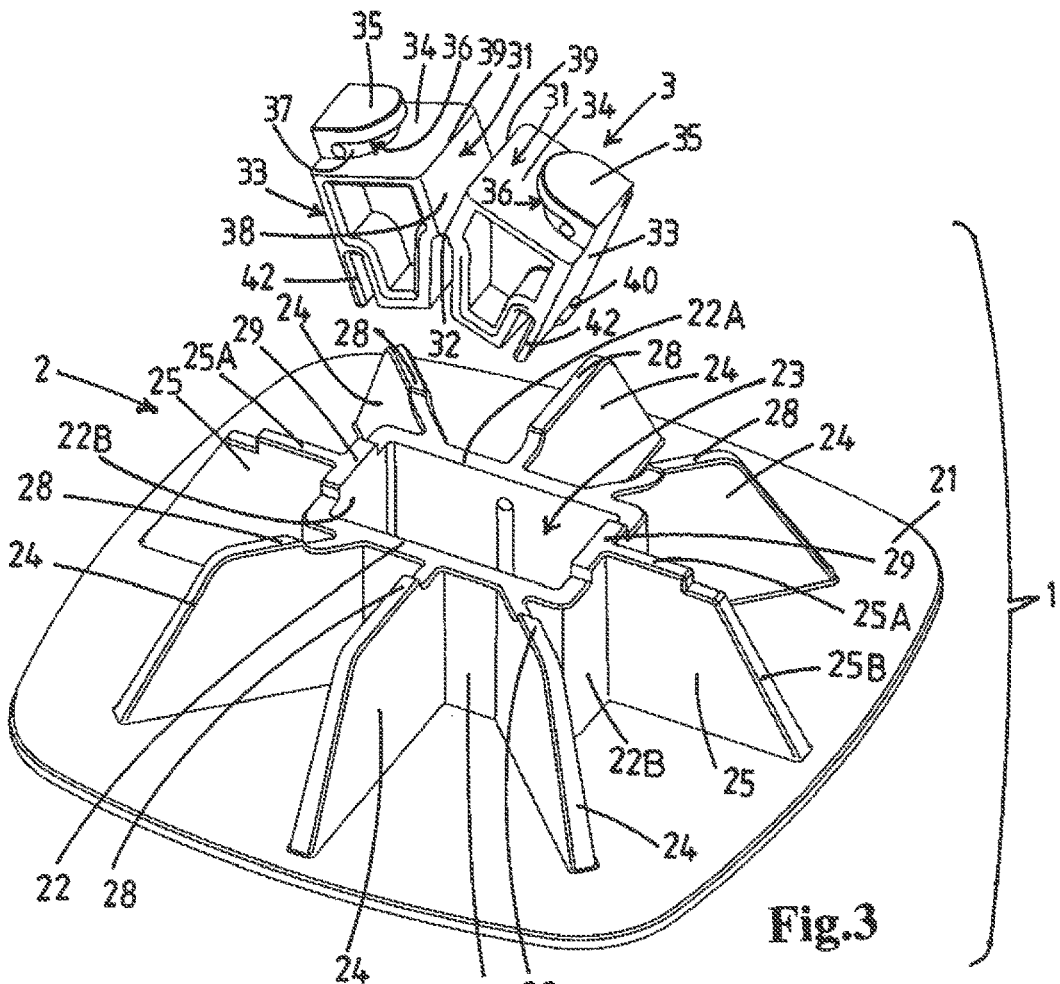
FIG. 3 shows in a view in perspective the support foot of FIG. 1 before assembly.

The support foot 1 comprises a base part 2 and a securing element 3, which are preferably two separate parts, as can be best seen in FIG. 3. Both parts 2, 3 are preferably made of plastic by injection moulding, but one or both parts 2, 3 may also be made of another material for example steel or another metal.

The base part 2 comprises a base plate 21, which in the shown example is substantially square with rounded corners, but which may have any other suitable shape, such as circular, triangular, polygonal, etc. The base plate 21 is intended to be placed on a support surface such as for example a rooftop. Under the base plate 21 a rubber underlay 50 may be arranged, which is shown in FIG. 9. The underlay 50 increases the grip of the support foot on the support surface and provides vibration insulation between the support surface and the framework.

In a middle portion on the top side of the base plate 21 a socket 22 is located. The socket 22 in this embodiment has a generally rectangular cross section and defines a receiving space 23. The socket has opposing lateral walls 22A and opposing head walls 22B.

From the outside of the lateral walls 22A of the socket 22 stiffening ribs 24 are extending outwardly on the upper side of the base plate 21 towards the edge of the base plate 21. From the outside of the head walls 22B of the socket 22 stiffening ribs 25 are extending outwardly on the upper side of the base plate 21 towards the edge of the base plate 21. The stiffening ribs 24 and 25 have an upper edge 24A, 25A, which extends substantially parallel to the base plate 21, and an inclined edge 24B, 25B which extends from the upper edge 24A, 25A towards the base plate 21.

The securing element 3 of the support foot 1 is adapted to be received in the receiving space 23 of the socket 22. This is illustrated inter alia in FIGS. 1, 3 and 4.

Figure 5:
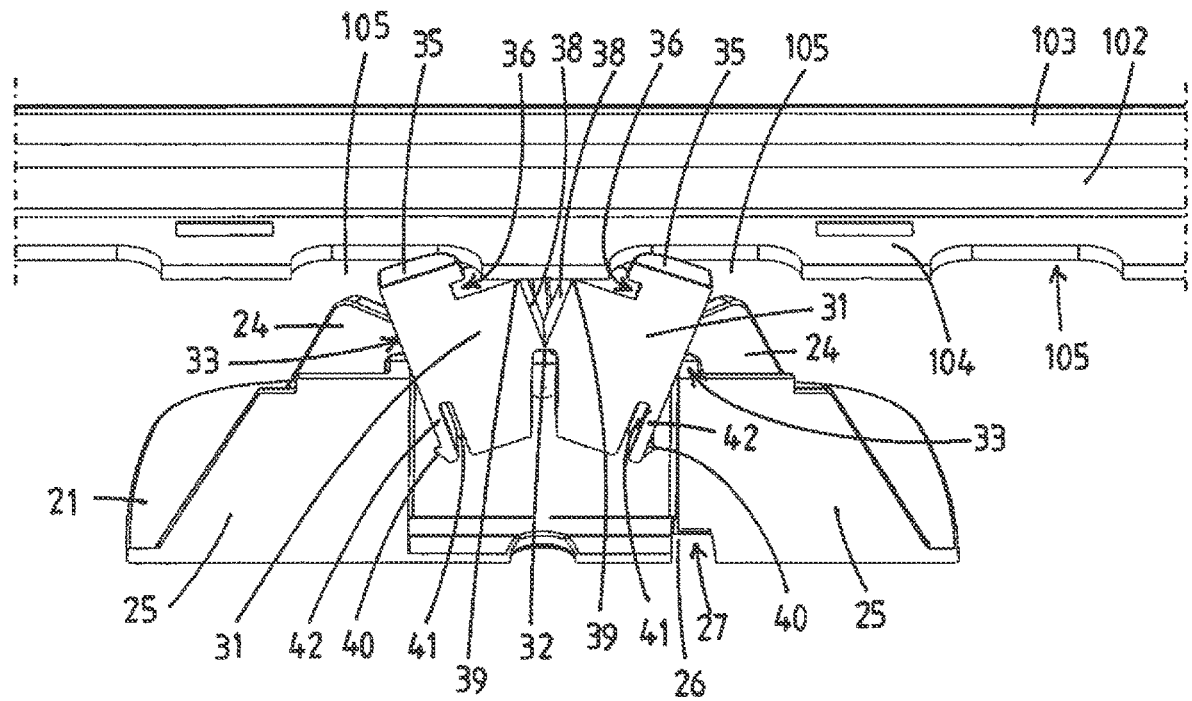
FIG. 5 shows a cross section of the support foot of FIG. 1 in the pre-assembly state of FIG. 4 during assembly with a profiled section element.

The securing element 3 comprises two opposing bodies 31 connected by a hinge 32 as is best visible in FIGS. 3 and 5. In this embodiment shown in the figures, the hinging axis defined by the hinge 32 lies in a centre plane which extends between the two opposing bodies 31. In the FIGS. 7 and 8 the centre plane is illustrated by a dash dotted line indicated by "CP". In a possible embodiment the securing element 3 may have a substantially symmetrical shape with respect to the centre plane CP.

Figure 6:
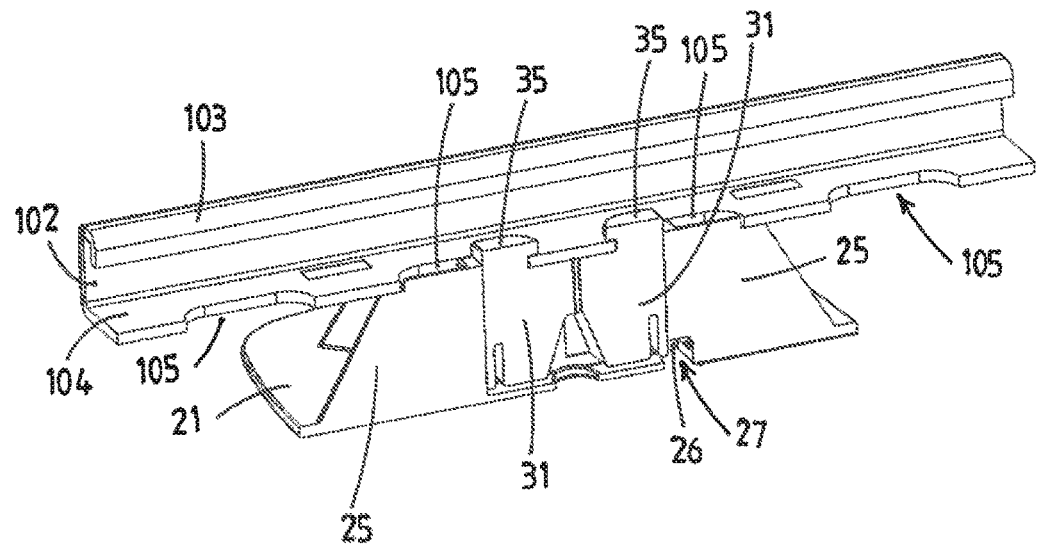
FIG. 6 shows in a view in perspective a cross section of the support foot of FIG. 1 in the assembled state of FIG. 2 with the profiled section element secured to it.

In this embodiment the two opposing bodies 31 are formed as two blocks, which are connected by a film hinge 32. The opposing bodies 31 can be hinged from an open state as is shown in FIGS. 3-5 to a closed state as is shown in FIGS. 1 and 6.

The opposing bodies 31 each have a sliding surface 33. In an unloaded state the sliding surfaces 33 are biased outwardly by the resilience of the film hinge 32, such that the sliding surfaces are inclined with respect to the centre plane CP as is best seen in FIG. 7. In an unloaded state the two sliding surfaces 33 in this specific embodiment form a tapering shape, wherein the sliding surfaces 33 are adapted to slide along an upper edge of the socket walls 22B when the securing element 3 is inserted in the socket 22.

Figure 4:
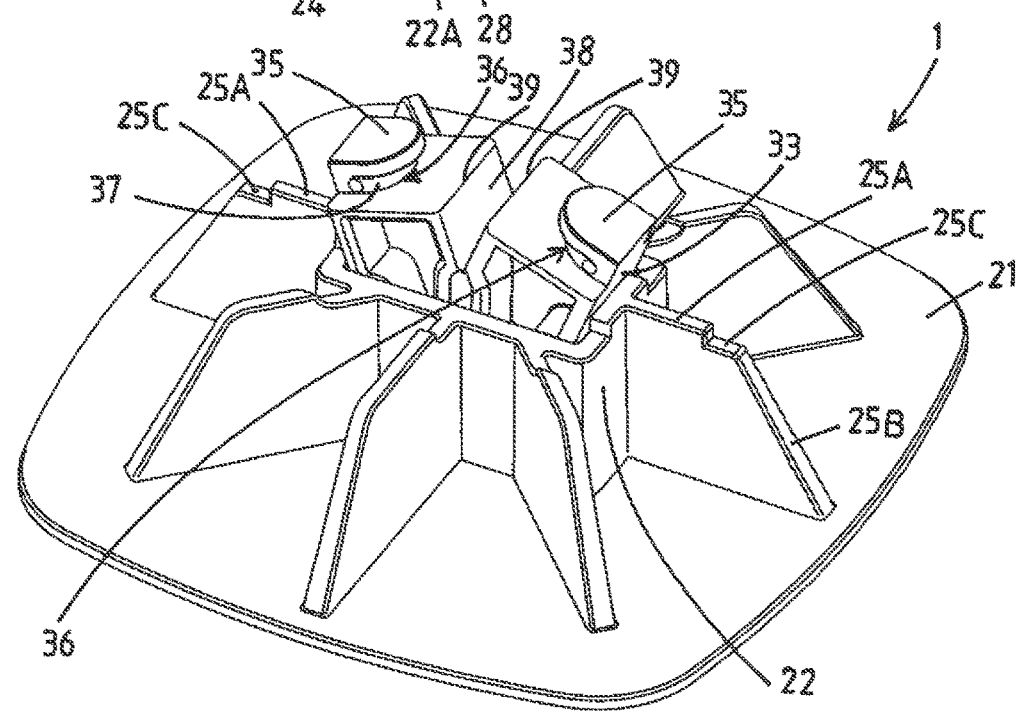
FIG. 4 shows in a view in perspective the support foot of FIG. 1 in a pre-assembly state.

At first the respective sliding surfaces 33 will rest on the upper edge of the respective socket walls 22B as is shown in FIG. 4. When the securing element 3 is pushed into the socket 22 the sliding surfaces 33 slide along the edge of the socket walls 22B which forces the respective sliding surfaces 33 inwardly whereby the opposing bodies 31 are moved to the closed state shown in FIGS. 1 and 6, wherein abutment surfaces 38 of the opposing bodies 31 abut each other.

On an upper side 34 of the respective bodies 31 a catch member formed. In this specific embodiment the catch member 35 is formed as a sort of boss which has an undercut 36 formed in it (cf. FIG. 7), which is adapted to grip in a hooking manner over an edge of an aperture 105 in the profiled section element 100 as is shown in FIGS. 2 and 6. The edge of the aperture 105 is thus received in the undercut 36 as is best visible in the view of FIG. 6. The surface 37 of the boss at the undercut 36 is rounded and corresponding to the rounding of the end portions of the aperture 105, such that a sturdy engagement between the catch member 35 and the edge of the aperture 105 is achieved.

It must be noted that also other hooking shapes formed on the bodies 31 are conceivable than the one specifically shown in the embodiment in the figures.

In use the base part 2 is placed with its base plate 21 on the support surface such as a rooftop. Next the securing element 3 is loosely arranged in the socket 22 of the base part 2 such that the state is achieved as is shown in FIG. 4. In this state the securing element rests with the respective sliding surfaces 33 thereof on the edge of the socket 22. In this position the catch members 35 are in a pre-assembly position, i.e. in this specific embodiment in a tilted position and spread apart from each other. Next, a profiled section element 100, in this example a mounting rail, is arranged on top of the securing element 3. Thereby an underside of the bottom wall 104 of the profiled section element 100 engages the respective edges 39 between the respective abutment surfaces 38 and the respective top surfaces 34, which edges extend most upwardly due to the tilted state of the opposing bodies 31. This can be best seen in FIG. 5. The respective catch members 35 are inserted through respective apertures 105 in the bottom wall 104 of the profiled section element 100 (cf. FIG. 5). Next the user can push the rail down towards the base part 2, whereby the bottom wall 104 forces the edges 39 down and the abutment surfaces 38 start to tilt towards each other. Also the catch members 35 start to tilt such that they move towards each other and the edges of the respective apertures 105 are received in the respective undercuts 36 formed in the catch members 35. By continuing pushing down, the sliding surfaces 33 will slide along the edge of the socket 22 and the opposing bodies 31 will further tilt toward each other until the abutment surfaces 38 abut each other. At that point the surface 37 engages firmly against the edge of the aperture 105 and the catch members are in their securing position. The profiled section element 100 is then secured to the support foot 1.

In the embodiment shown in the figures, at an underside of each of the sliding surfaces 33 a locking lug 40 is formed. In the underside of the socket 22 at least one corresponding locking recess 26 is formed. When the securing element 3 has gripped the profiled section element 100 and is further pushed down into the socket at least one of the locking lugs 40 will snap into the locking recess 26. Thereby the securing element 3 is locked in the socket 2 and the profiled section element 100 is fixedly secured to the support foot 1. Near the locking recess 26 the base plate 21 is provided with an access opening 27 which allows a user to access the locking lug 40 and push it out of the recess, for example with a screw driver, in case the securing element 3 and the base part 2 have to be released from each other. Alternatively or additionally the locking recess 26 may also be formed as a through opening in the head wall 22B of the socket whereby also from outside the socket 22 the locking lug 40 may be accessed and pushed out of the locking recess 26 to release the securing element 3 from the base part 2.

In order to add some resilience to facilitate the snapping action and the possible release of the snapping locking lug 40 and recess 26, the opposing bodies 31 are provided with a slot 41 extending from the bottom end upward to some extent. Thereby the lower end of the sliding surface 33 is formed as a deformable tongue 42 on which the locking lug 40 is formed. By pushing this deformable tongue 42 inwardly, the locking lug 40 can be decoupled from the locking recess 26.

The stiffening ribs 24 have an upper edge 24A, which adjoins the upper edge of the socket 22. In the region adjacent the socket 22 the upper edge 24A is at the same level. The upper edge 24A has an elevated portion 28 at a certain distance from the socket 22. The distance between two opposite elevated portions 28 is slightly larger than the outer width of the profiled section element 100 that is mounted on the support foot 1, such that the profiled section element 100 fits between the elevated portions 28 as may be seen in FIG. 2. The elevated portions 28 thus provide lateral support to the profiled section element 100 and facilitates a good lateral holding of the position of the profiled section element 100 on the support foot 1.

The upper edge of the head wall 22B of the socket 22 has an elevated portion 29, which has a length that is slightly smaller than the width of the apertures 105 in the bottom wall 104 of the profiled section element 100. The elevated portion 29 of the upper edge of the socket wall 22B is inserted in the aperture 105 in the mounted state and prevents a shifting in the lateral direction of the profiled section element 100 relative to the socket 22. A good lateral holding of the position of the profiled section element 100 on the support foot 1 is thereby facilitated.

The stiffening ribs 25 have an elevated portion 25A on the upper edge thereof. In the embodiment shown in the figures the elevated portion 25A on the rib 25 and the elevated portion 29 on the upper edge of the socket wall 22B adjoin each other and form a T-shape. At the end of the elevated portion 25A remote from the socket wall 22B an end portion 25C of the upper edge of the rib 25 is formed which is recessed with respect to the elevated portion 25A and which lies on the same level as the upper edge of the socket 22. The elevated portion 25A is adapted to be received in the aperture 105. The distance between the ends of the two elevated portions 25A is slightly smaller than the distance between two remote end edge portions of two consecutive apertures 105. This prevents shifting in the longitudinal direction of the profiled section element 100 relative to the socket 22. A good longitudinal holding of the position of the profiled section element 100 on the support foot 1 is thereby facilitated.

Figure 10:
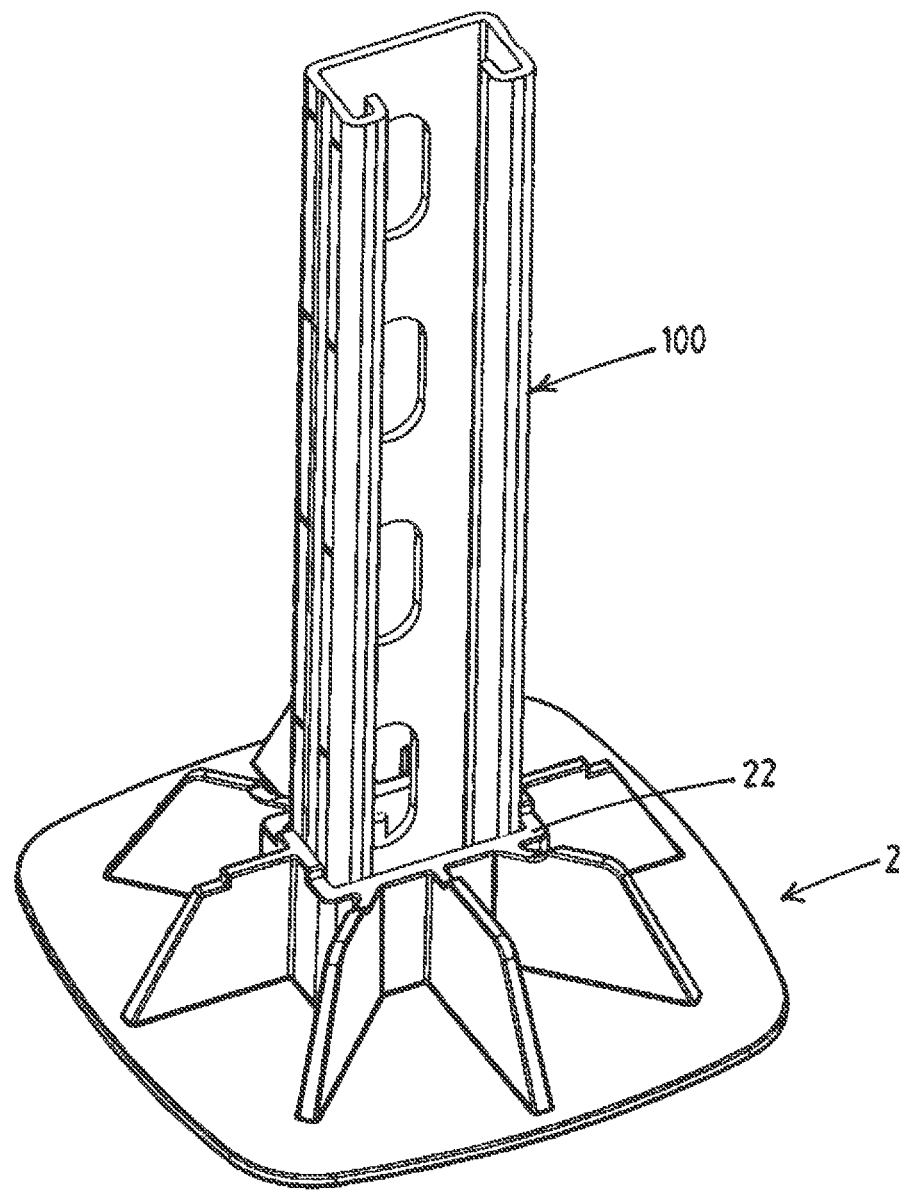
FIG. 10 shows a view in perspective of the support foot in a different modus assembled with an upstanding profiled section element.

The socket 22 of the base portion 2 is dimensioned such that it is also adapted to receive an end portion of a profiled section element 100, in this example a mounting rail, in an upstanding fashion as is visible in FIG. 10. This feature makes the support foot 1 more versatile in application. In this application the securing element 3 can thus be omitted.

The invention claimed is:

1. A support foot for supporting a free standing structure on a support surface, the support foot including a securing element for holding a profiled section to which other parts of said structure can be mounted, wherein the profiled section comprises at least one wall having apertures formed in it,
the support foot comprising:
a base part having a socket, and
the securing element adapted to be received in the socket and having at least one movable catch member to catch an edge of one of said apertures so as to secure the profiled section to the support foot, wherein the catch member is movable from a pre-assembly position, in which it can be inserted through the aperture, to a securing position, in which it engages over the edge of the aperture,
wherein the securing element comprises a sliding surface associated with the catch member, said sliding surface being biased resiliently outwardly and adapted to slide along an edge of the socket when the securing element is inserted in the socket, such that the sliding surface is forced inwardly by the edge of the socket, whereby the catch member is moved from the preassembly position to the securing position.

2. The support foot according to claim 1, wherein the securing element comprises two opposing bodies connected by a hinge, wherein the sliding surface is formed on each body side facing away from the hinge, and wherein the catch member is formed on top of each body.

3. The support foot according to claim 2, wherein a hinging axis defined by the hinge lies in a centre plane which extends between the two opposing bodies.

4. The support foot according to claim 3, wherein the securing element is substantially of symmetrical design, wherein the centre plane constitutes a plane of symmetry.

5. The support foot according to claim 2, wherein at least one of the bodies has a locking lug formed on the side of the sliding surface, and wherein the socket is formed with a locking recess to cooperate with the locking lug when the securing element is fully inserted in the socket.

6. The support foot according to claim 1, wherein the securing element is made of a plastic material.

7. The support foot according to claim 1, wherein the base part is made of a plastic material.

8. The support foot according to claim 1, wherein the socket is shaped and dimensioned to receive an end portion of a profiled section element in upstanding position.

9. A support foot for supporting a free standing structure on a support surface, the support foot including a securing element for holding a profiled section to which other parts of said structure can be mounted, wherein the profiled section comprises at least one wall having apertures formed in it,
the support foot comprising:
a base part having a socket, and
the securing element placed on the socket and adapted to be received in the socket, the securing element having at least one movable catch member to catch an edge of one of said apertures so as to secure the profiled section to the support foot, wherein, when the securing element is on the socket, the catch member is in a pre-assembly position, in which it can be inserted through the aperture, and wherein, when the securing element is received in the socket, the catch member is moved to a securing position, in which it engages over the edge of the aperture.

10. The support foot according to claim 9, wherein the securing element is made of a plastics material.

11. The support foot according to claim 9, wherein the base part is made of a plastics material.

12. The support foot according to claim 9, wherein the socket is shaped and dimensioned to receive an end portion of a profiled section element in upstanding position.

* * * * *